US008683374B2

(12) United States Patent  
Vaughan et al.

(10) Patent No.: US 8,683,374 B2
(45) Date of Patent: Mar. 25, 2014

(54) DISPLAYING A USER'S DEFAULT ACTIVITIES IN A NEW TAB PAGE

(75) Inventors: Christopher M. Vaughan, Seattle, WA (US); Nathan J. E. Furtwangler, Seattle, WA (US); Ronald O. Forbes, Seattle, WA (US); Jane T. Kim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1281 days.

(21) Appl. No.: 12/145,488

(22) Filed: Jun. 24, 2008

(65) Prior Publication Data

US 2009/0319938 A1    Dec. 24, 2009

(51) Int. Cl.
*G06F 3/048* (2013.01)

(52) U.S. Cl.
USPC .......................................... 715/777; 715/770

(58) Field of Classification Search
USPC ................. 715/777, 770, 769, 781, 810, 813
See application file for complete search history.

(56) References Cited

U.S. PATENT DOCUMENTS

| 6,247,020 | B1 | 6/2001 | Minard |
| 7,568,149 | B2 * | 7/2009 | Edwards et al. ............... 715/205 |
| 2005/0198582 | A1 * | 9/2005 | Hennum et al. ............... 715/772 |
| 2005/0235219 | A1 | 10/2005 | Szeto |
| 2005/0246651 | A1 * | 11/2005 | Krzanowski ................... 715/770 |
| 2006/0095838 | A1 | 5/2006 | Nguyen et al. |
| 2006/0206834 | A1 | 9/2006 | Fisher et al. |
| 2006/0218500 | A1 * | 9/2006 | Sauve et al. ................... 715/767 |
| 2006/0271858 | A1 | 11/2006 | Yolleck et al. |
| 2007/0067733 | A1 | 3/2007 | Moore et al. |
| 2007/0180381 | A1 | 8/2007 | Rice et al. |
| 2009/0106698 | A1 * | 4/2009 | Hansen et al. ................. 715/838 |

FOREIGN PATENT DOCUMENTS

WO    WO2007139290 A1    12/2007

OTHER PUBLICATIONS

"Dynamic Ajax Tabs in 20 Lines", retrieved at <<http://20bits.com/2007/05/23/dynamic-ajax-tabs-in-20-lines/>>, pp. 5.
"Tennis Network", 2007, Top Network LLC., pp. 3.
"Mozilla Firefox", 2005-2008, Mozilla, pp. 5.
"Opera Browser Ver: 9.25", Opera Software ASA, pp. 3.

* cited by examiner

*Primary Examiner* — Rashawn Tillery
(74) *Attorney, Agent, or Firm* — Andrew Sanders; Micky Minhas; Wolfe-SBMC

(57) ABSTRACT

In one or more embodiments, a Web browser is configured to enable a user to open a new tab and, responsively, display one or more activities in a new tab page for the user. The user can then select, from the new tab page, one or more activities to be performed. In at least some embodiments, a user can select an object in a first tab page, open a new tab page, and select an activity on the new tab page that is to be performed relative to the selected object.

20 Claims, 9 Drawing Sheets

DISPLAYING A USER'S DEFAULT ACTIVITIES IN A NEW TAB PAGE

BACKGROUND

In a browsing context that utilizes tabbed browsing, often times a user will open new tab responsive to a desire to perform a subsequent navigation. For example, a user may find, in a first tab, an address of a restaurant at which they wish to dine. They may then open a new browser tab in order to then navigate to a mapping website so that they can either type in or paste the restaurant's address into a suitable input box so that they can see a map on which the restaurant appears.

Some Web browsers enable a user to install or otherwise use activities that are available through their Web browser. For example, activities may be installed and available to the user through an interface instrumentality that appears in the chrome of their browser's interface. Yet, many users may be unfamiliar with the notion of an activity that can be selected from their browser's chrome.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a Web browser is configured to enable a user to open a new tab and, responsively, display one or more activities in a new tab page for the user. The user can then select, from the new tab page, one or more activities to be performed. In at least some embodiments, a user can select an object in a first tab page, open a new tab page, and select an activity on the new tab page that is to be performed relative to the selected object.

DETAILED DESCRIPTION

Overview

In one or more embodiments, a Web browser is configured to enable a user to open a new tab and, responsively, display one or more activities in a new tab page for the user. The user can then select, from the new tab page, one or more activities to be performed. In at least some embodiments, a user can select an object in a first tab page, open a new tab page, and select an activity on the new tab page that is to be performed relative to the selected object.

In the discussion that follows, a section entitled "Operating Environment" describes but one environment in which the various embodiments can be employed. Following this, a section entitled "Example Service/Activity Preview" describes embodiments in which services or activities can be previewed by a user. Next, a section entitled "Example Cascading Menu" describes a cascading menu in accordance with one or more embodiments. Following this, a section entitled "Example Methods" describes example methods in accordance with one or more embodiments. Last, a section entitled "Example System" is provided and describes an example system that can be used to implement one or more embodiments.

Operating Environment

Figure 1:
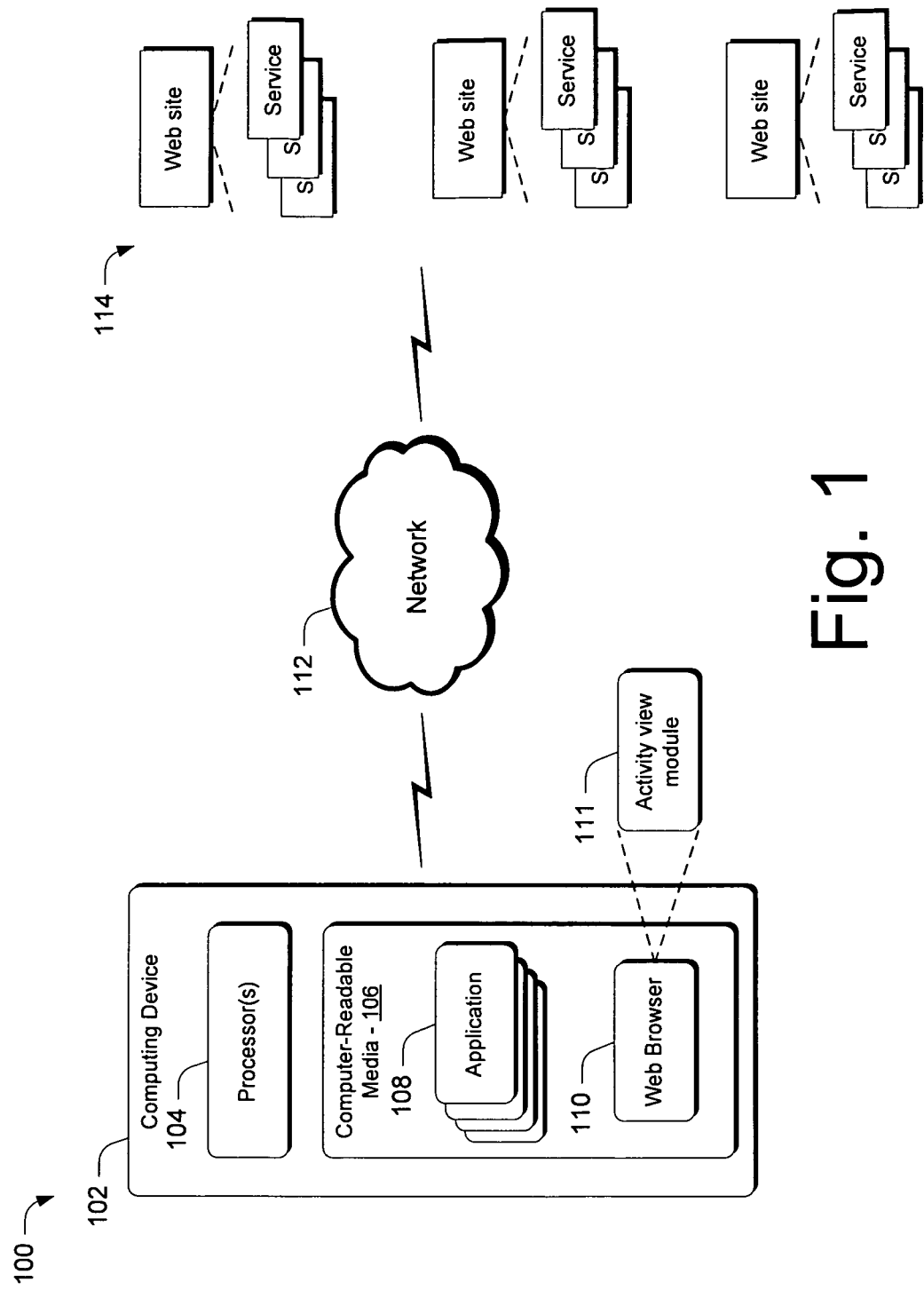
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as, by way of example and not limitation, reader applications, e-mail applications, instant messaging applications, and a variety of other applications. An application in the form of a Web browser 110 can include or otherwise make use of an activity view module 111 that operates as described above and below. The activity view module can enable a user to be exposed to selected activities in ways other than through the chrome of their Web browser, as will become apparent below.

The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 10.

In addition, environment 100 includes a network 112, such as the Internet, and one or more web sites 114 from and to which content can be received and sent. Websites 114 can offer a variety of services or activities that can be integrated by applications 108 and/or Web browser 110, as will become apparent below.

Computing device 102 can be embodied as any suitable computing device such as, by way of example and not limitation, a desktop computer, a portable computer, a handheld computer such as a personal digital assistant (PDA), cell phone, and the like.

Before describing embodiments in which activities can be displayed in a new tab page, consider the following discussion which describes how services or activities can be previewed by a user. The following discussion is intended to provide the reader with an understanding and context of services or activities.

Example Service/Activity Preview

When a user has one or more services or activities that they can enable, a first step in a preview process is discovery of services or activities that pertain to a particular action that the user has taken. So, for example, when the user makes a text selection, in one or more embodiments, a user interface instrumentality, such as an in-page discovery button can be rendered for the user to inform the user that one or more services or activities have been found that are relevant to a given selection. When the user clicks on the button, a menu of available services or activities is rendered for the user.

In some instances, the menu can accommodate a large number of services. A default menu can also be rendered for the user. For example, the default menu can provide a listing for each of the services or activities that a user has installed. In addition, a cascading menu can be accessed from the default menu and can be used to show multiple services or activities grouped by category. This can be useful because a user may have multiple different services of the same type, such as multiple mapping services. This way, the user can easily parse all the services using the default menu and then use an expanded cascading menu to search for different services. As an example, consider FIG. 2.

Figure 2:
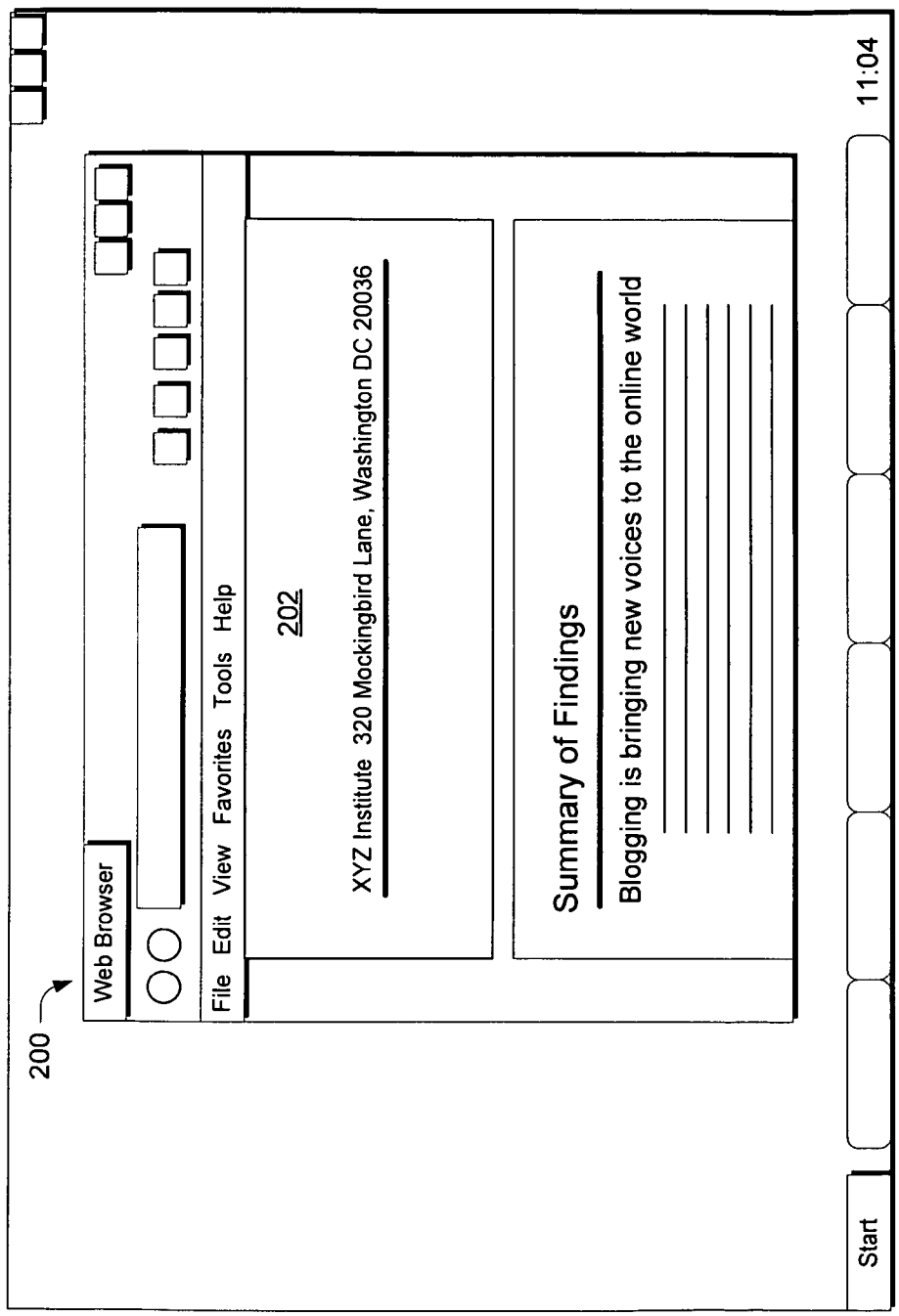
FIG. 2 illustrates a user interface for a Web browser in accordance with one or more embodiments.

FIG. 2 illustrates a user interface for a Web browser generally at 200. In this example, a user has opened the Web browser on their desktop and has opened, using the browser, a web page 202.

Figure 3:
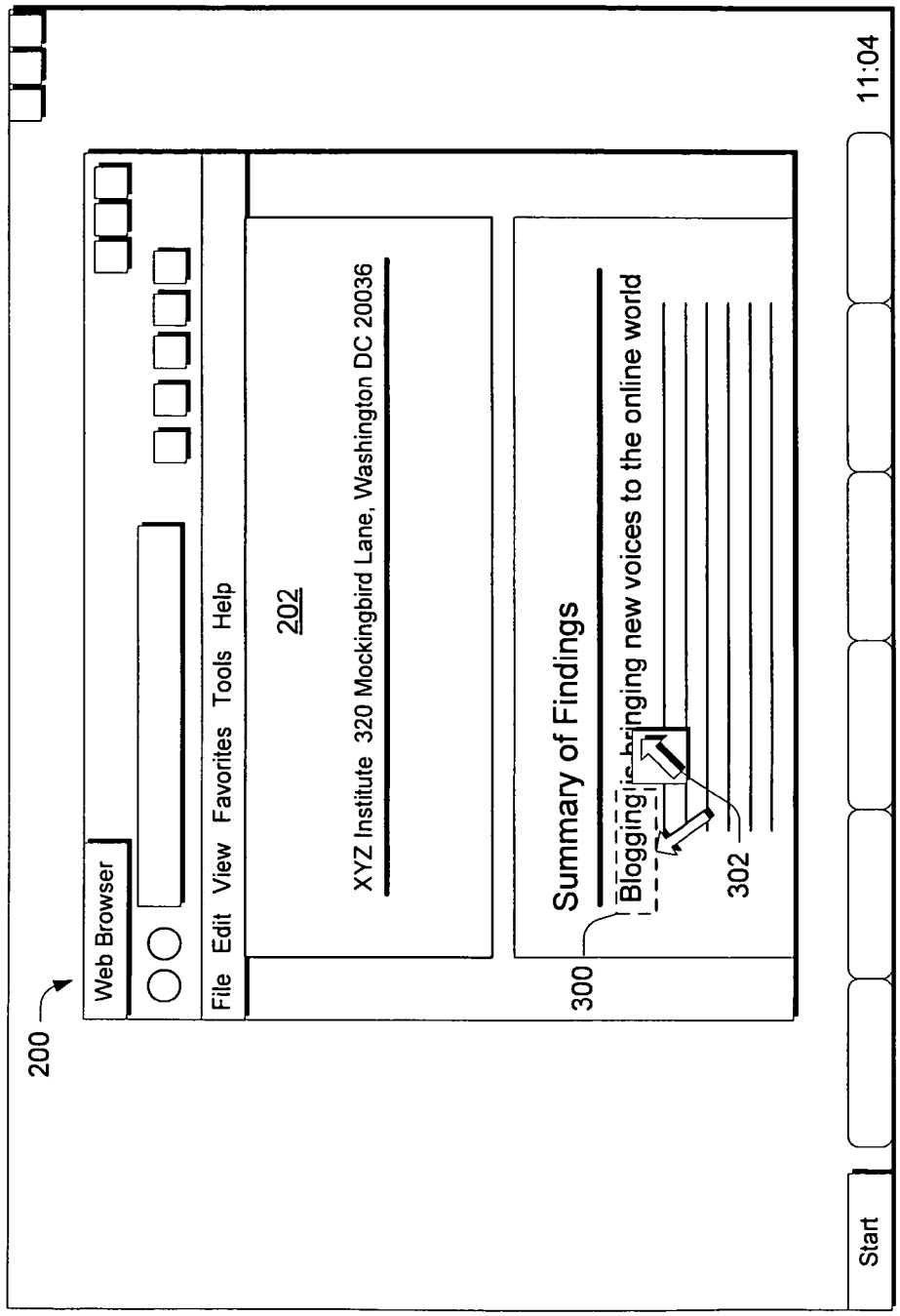
FIG. 3 illustrates a user interface for a Web browser in accordance with one or more embodiments.

Referring to FIG. 3, the user has selected the text "Blogging" with their cursor, indicated by the dashed box at 300. Responsive to this user action, a user interface instrumentality in the form of an in-page discovery button 302 is rendered adjacent the user's selection. The in-page discovery button indicates to the user that one or more services or activities have been ascertained to be relevant to the user's selection.

At this point, the user can take further action to expose a list or menu of available services or activities. In the illustrated and described embodiment, this further action can comprise clicking on or otherwise selecting the in-page discovery button 302. In at least some embodiments, a user can indicate a selection of the in-page discovery button by using their keyboard or other input device. For example, responsive to the rendering of the in-page discovery button, a user can enter a certain hot key combination to indicate their selection.

Figure 4:
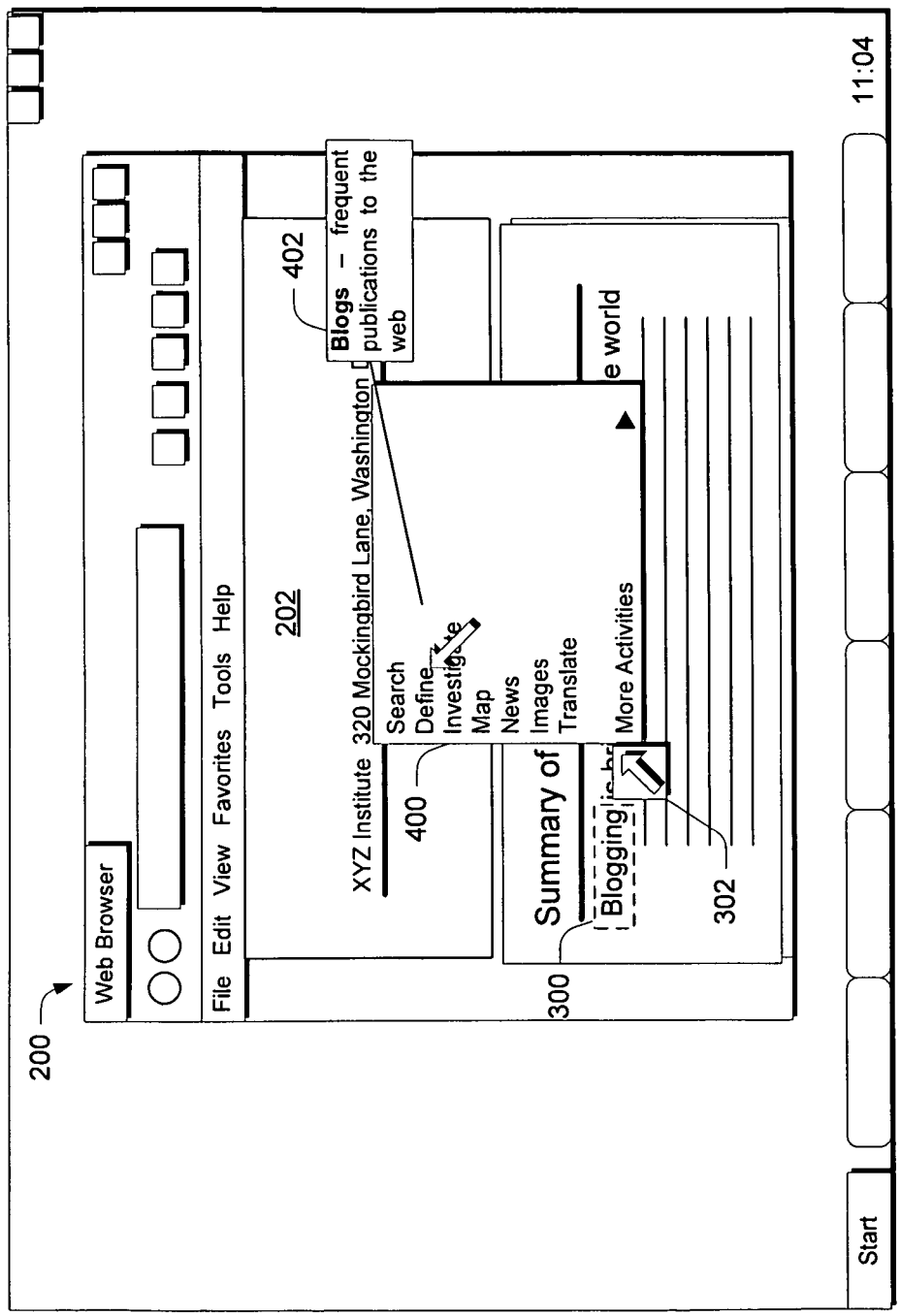
FIG. 4 illustrates a user interface for a Web browser in accordance with one or more embodiments.

Responsive to selecting the in-page discovery button, a list or menu of relevant services or activities can be presented to the user. As an example, consider FIG. 4.

There, a user has selected the in-page discovery button 302. Responsive to the user's selection of the in-page discovery button, a list or menu 400 of relevant services or activities is rendered for the user. As shown, the services or activities include, by way of example and not limitation, a search service, a define service, an investigate service, a map service, a news service, an images service, and a translate service. In addition, a "More Activities" selection is provided to enable the user to select and see a cascading menu as described above and below. In this particular example, list or menu 400 constitutes a default menu. In at least some embodiments, a default menu can include one service or activity in each different service category. Which service to display in a default menu can be decided upon using any suitable criteria. For example, a default menu might contain user-designated favorite services or activities. Alternately, the default menu might contain the last services or activities used by the user. Other criteria can, of course, be used.

Once the list or menu 400 is presented for the user, the user may opt to view a preview of a particular service by taking a further user action. In this specific example, the user hovers their cursor over or near the Define service. Responsively, a preview 402 is rendered for the user. The preview is logically connected with the selected service or activity by virtue of a leader which, in this example, constitutes a visual line from the service or activity to the preview 402.

In this particular example, the preview briefly defines the term that has been selected by the user. In this example, when a user hovers their cursor on or near a service or activity, the user's selection which, in this case is the term "blogging", is communicated over the Web to a server. The server receives the user's selection and, responsively, returns renderable data that is used to populate the preview 402.

At this point, the user may or may not choose to execute the service or activity. If the user chooses to execute the service or activity by, for example, clicking on the preview 402, a full navigation to a definition site can take place. In one or more embodiments, the definition site can be automatically opened in a new tab in the user's browser. Alternately or additionally, the user can be navigated to the definition site with focus placed on the definition site.

In at least some embodiments, a preview can also include one or more links that can be selected by the user as by clicking on a particular link. By clicking on a particular link, a navigation to that link can take place in any of the ways mentioned above. Further, a navigation can take place within a window in which the preview is rendered as well.

Example Cascading Menu

Figure 5:
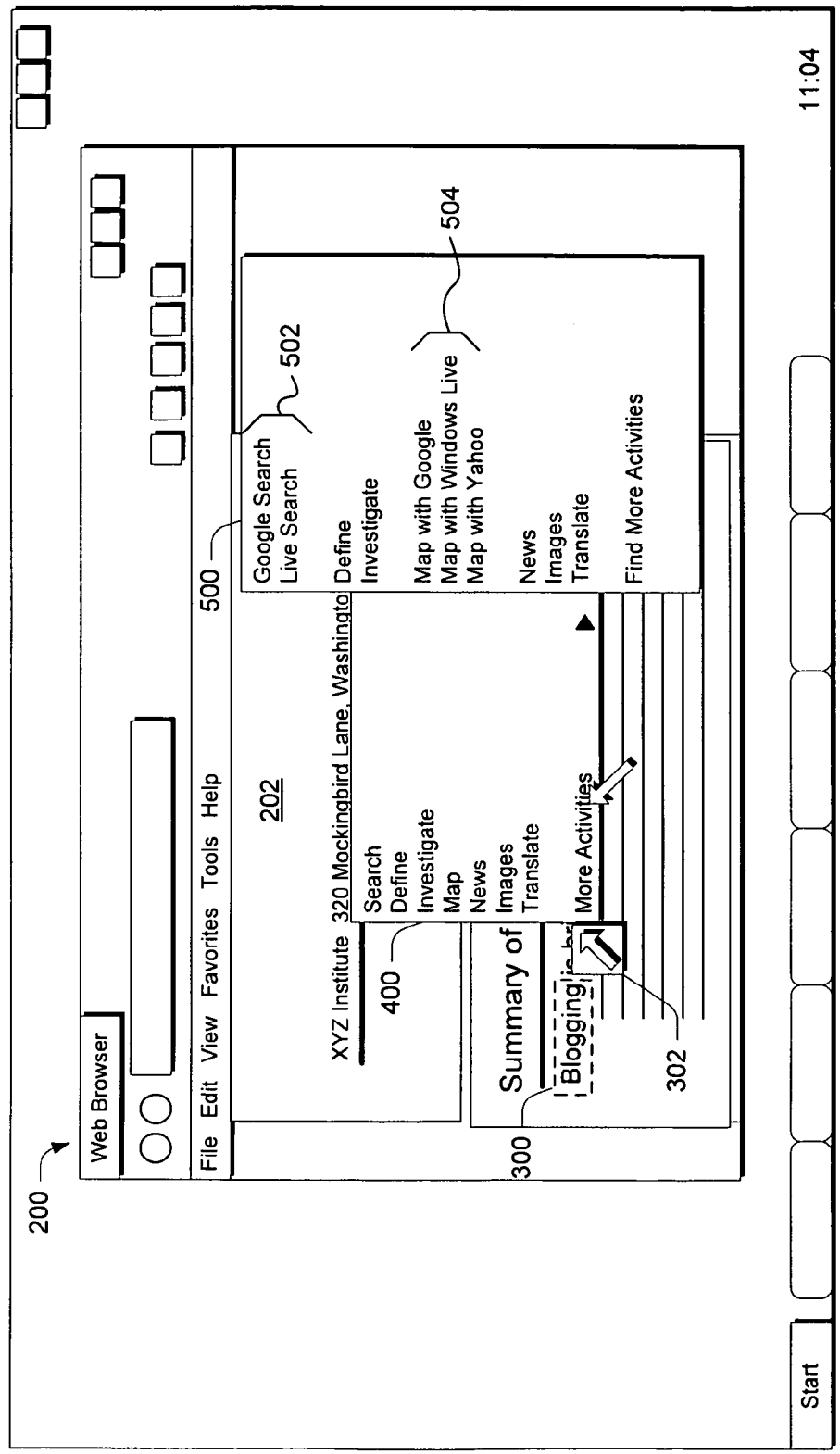
FIG. 5 illustrates a user interface for a Web browser in accordance with one or more embodiments.

As noted above, a "More Activities" selection can be provided in the list or menu to enable the user to select and see a cascading menu in which services or activities are categorized by type. When the user selects the "More Activities" selection, a list or menu of services or activities categorized by types can be presented for the user. As an example, consider FIG. 5.

There, the user has selected the "More Activities" selection by virtue of clicking on the selection with their cursor. Responsively, a cascading list or menu 500 is presented in which various services or activities are categorized by type. In the illustrated and described embodiment, a search service type 502 and a map service type 504 are presented in the cascading list or menu. In this particular example, the search service type 502 includes two different search services from which the user can select. Similarly, the map service type 504 includes three mapping services from which the user can select. Having a cascading list or menu can enable a user to be exposed to his or her full complement of relevant services or activities. From this cascading list or menu, the user can then select a service or activity to be executed.

Consider now a situation in which the user is unaware of the in-page discovery button 302 or otherwise chooses to ignore it. Consider also that the user has selected an object in one tab of their Web browser and copied the object to their browser's clipboard. Assume also that the user intends to use the copied object in a subsequent navigation and, responsively, opens a new tab.

Figure 6:
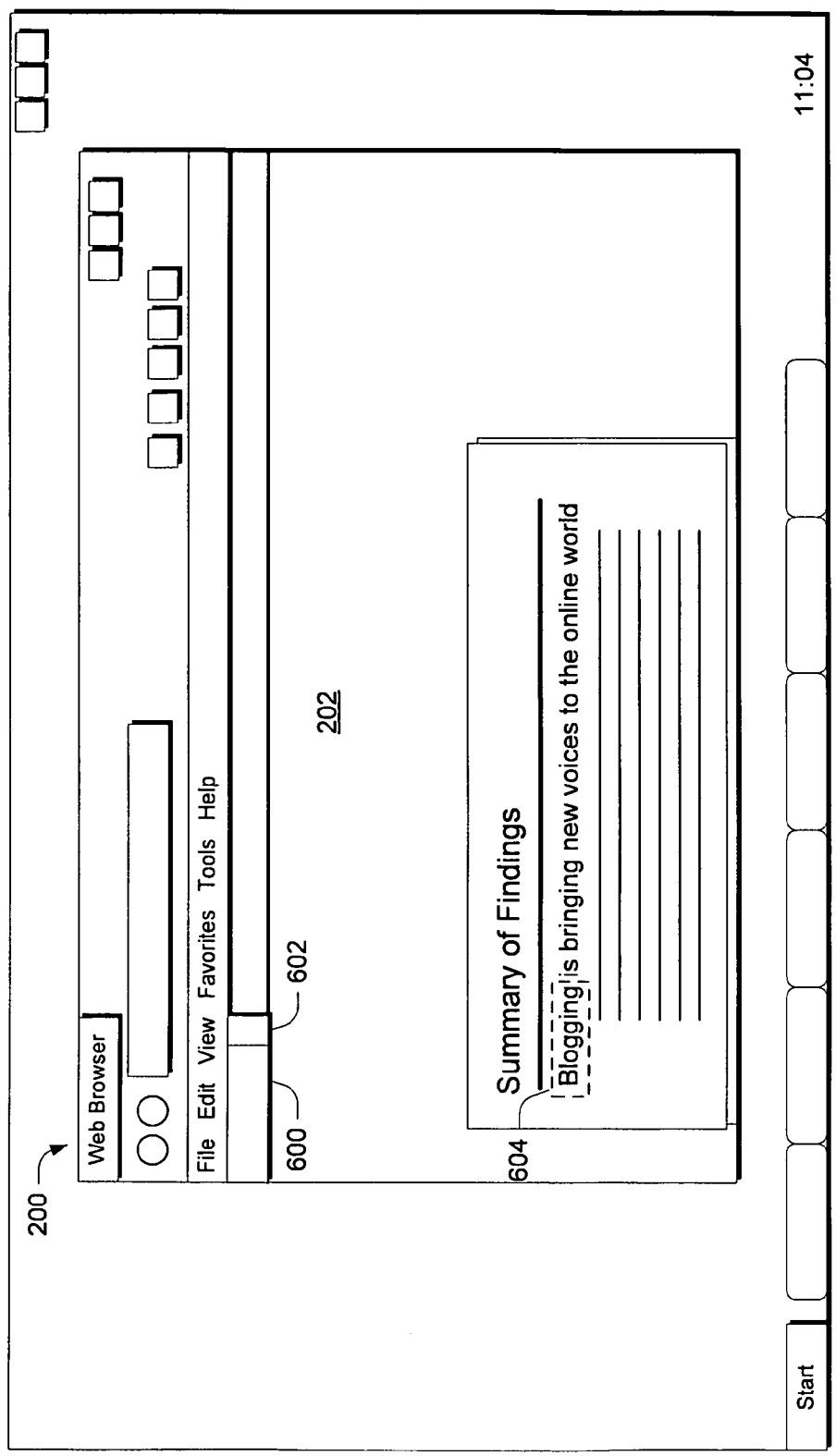
FIG. 6 illustrates a user interface for a Web browser in accordance with one or more embodiments.

As an example, consider FIG. 6 which illustrates a user interface for a Web browser generally at 200. In this example, a user has opened the Web browser on their desktop and has opened, using the browser, a web page 202. The browser includes a collection of tabs which, in this example, includes a first tab 600 and an instrumentality 602 that can be used by the user to open a new tab. The user can open a new tab using instrumentality 602 by simply clicking on the instrumentality. In this example, a web page displayed in the first tab includes a document entitled "Summary of Findings". The user has selected an object in the form of the text "Blogging" with their cursor, indicated by the dashed box at 604.

Figure 7:
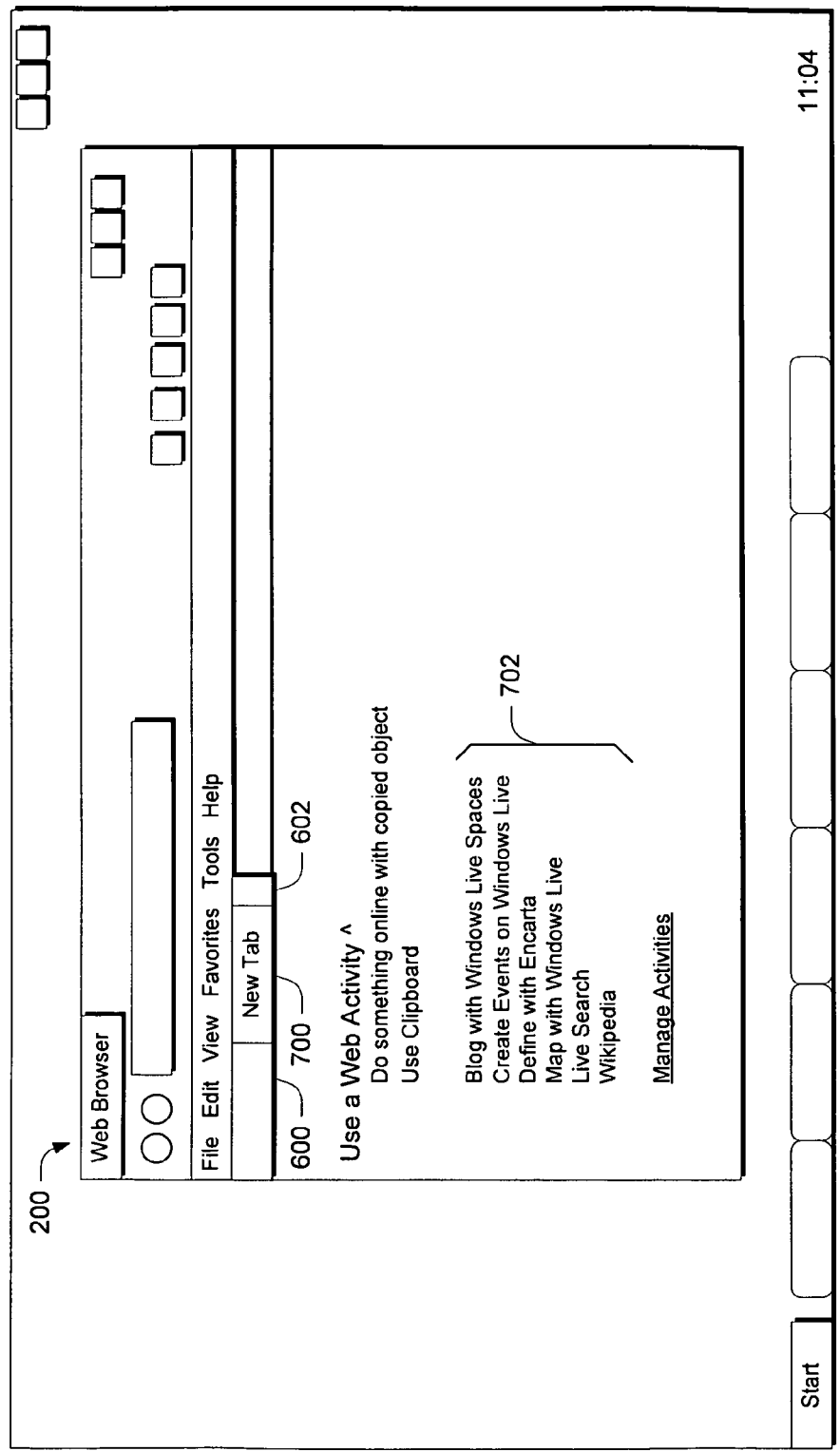
FIG. 7 illustrates a user interface for a Web browser in accordance with one or more embodiments.

Assume now that the user copies the object to the browser's clipboard as by right-clicking on the selection and selecting a "copy" option. Now, assume that the user opens a new tab by clicking on instrumentality 602. In one or more embodiments, a new tab is opened and a new tab page is displayed for the user. The new tab page can be configured to display one or more activities for the user. The user can then select, from the new tab page, one or more activities to be performed. As an example, consider FIG. 7.

There, the user has opened a new tab 700 and, responsively, the browser displays a new tab page for the user. In one or more embodiments, the new tab page is the first page that is presented to the user when the user opens a new tab. In this example, the new tab page includes a collection of activities 702 from which a user can select. The collection of activities is automatically displayed in the new tab page when it is opened. In one or more embodiments, the object that has been copied to the browser's clipboard can be the subject of an activity that can be selected by the user. For example, if a user selects the activity "Define with Encarta", that activity is automatically invoked using the object that appears on the browser's clipboard. Accordingly, in this example, the text "Blogging" will be used for the "Define with Encarta" activity. In at least some embodiments, the selected text can be provided to an entity that performs the definition activity, and a new tab can be opened that provides an activity-provided definition of the text.

In the example above, the user-selected object comprises text. It is to be appreciated and understood that other objects can be selected by the user and used for selected activities. Such other objects can include, by way of example and not limitation, an entire web page, sound files, images, and the like. In this way, a user can select a variety of objects and subsequently, through a new tab page, be exposed to activity functionality that can be automatically performed by simply selecting a particular activity. Exposing users to activities in this way enables users to learn about activities that are installed or otherwise available through their web browser.

In one or more embodiments, the collection of activities 702 can include default activities that have been selected by or otherwise selected for the user. For example, in embodiments where a user's activities have been categorized, the collection of activities 702 can include a first-listed activity from each category or individual categories.

In one or more embodiments, the new tab page can include other features that are useful for the user. For example, the "Use a Web Activity"" feature can be used to collapse the collection of activities 702. In at least some embodiments, when a collection of activities has been collapsed, the collection remains collapsed even when new tabs are opened. Further, in at least some embodiments, the "Use Clipboard" feature enables the user to check data that is on their clipboard before using it with a particular activity.

Further, in at least some embodiments, a "Manage Activities" feature enables a user to manage their activities from the new tab page. Managing activities can include, by way of example and not limitation, adding activities, deleting activities, changing activity categories, and the like.

In one or more embodiments, a user's activities can be automatically hidden depending on a particular mode that the user's computer or application is in. For example, when a user's computer is in a "presentation mode", as for example by being connected to a projector, the user's collection of activities can be automatically hidden so that the activities are not inadvertently disclosed to others.

Having considered various embodiments in which a user's activities can be exposed in a new tab page, considered now example methods in accordance with one or more embodiments.

Example Methods

Figure 8:
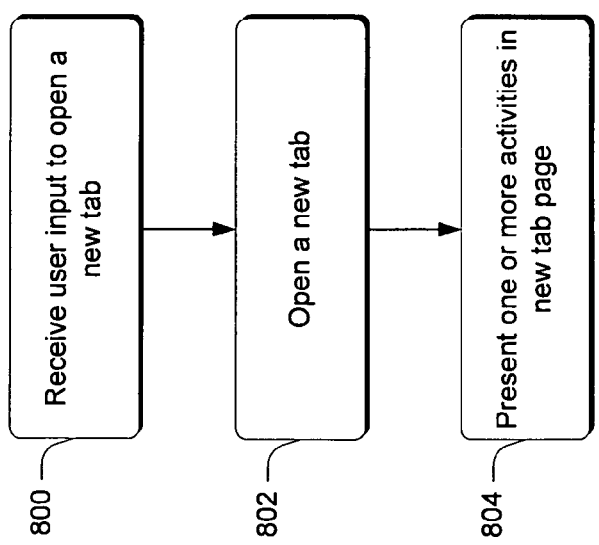
FIG. 8 is a flow diagram that describes steps in a method in accordance with one or more embodiments.

FIG. 8 is a flow diagram that illustrates steps in a method in accordance with one or more embodiments. The method can be implemented in connection with any suitable hardware, software, firmware, or combination thereof. In at least some embodiments, the method can be implemented by a suitably-configured Web browser.

Step 800 receives user input to open a new tab. This input can be received in any suitable way. For example, in at least some embodiments, the new tab can be opened by a user clicking on a suitably-configured user interface instrumentality. Step 802 opens a new tab responsive to the user's input. Step 804 presents one or more activities in a new tab page. Examples of how this can be done are provided above.

Figure 9:
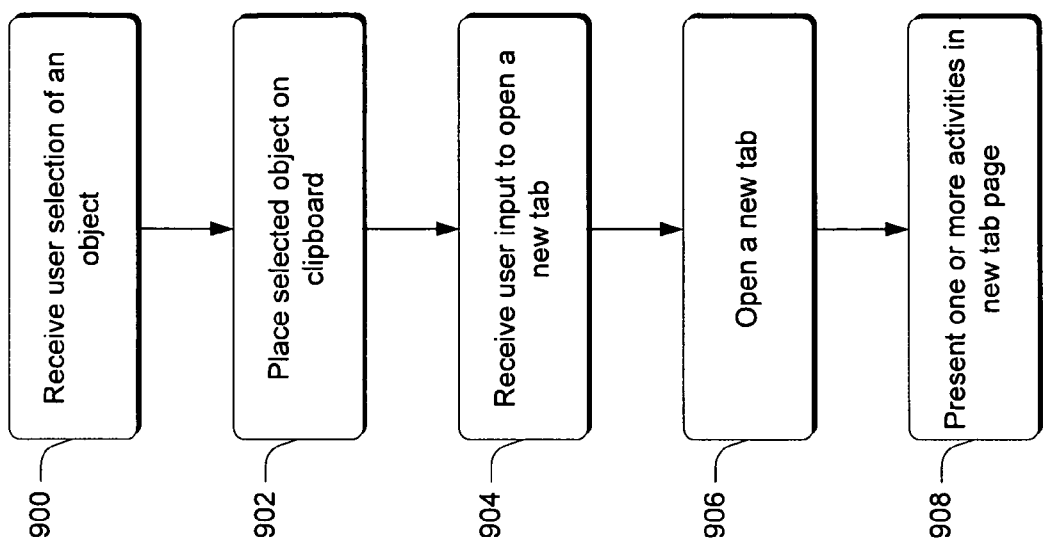
FIG. 9 is a flow diagram that describes steps in a method in accordance with one or more embodiments.

FIG. 9 is a flow diagram that illustrates steps in another method in accordance with one or more embodiments. The method can be implemented in connection with any suitable hardware, software, firmware, or combination thereof. In at least some embodiments, the method can be implemented by a suitably-configured Web browser.

Step 900 receives a user's selection of an object. The step can be performed in any suitable way and with any suitable type of object. For example, in at least some embodiments, an object can comprise text on a web page and a user can select the text using a suitable input device such as a computer mouse. Step 902 places the selected object on a clipboard. Step 904 receives a user input to open a new tab. This input can be received in any suitable way. For example, in at least some embodiments, the new tab can be opened by a user clicking on a suitably-configured user interface instrumentality. Step 906 opens a new tab responsive to the user's input. Step 908 presents one or more activities in a new tab page. Examples of how this can be done are provided above.

With the activities having been presented on the new tab page, an activity can be performed using, as a subject of the activity, the object residing on the clipboard. Examples of how this can be done are provided above.

Having described example methods in accordance with one or more embodiments, consider now a discussion of an example system that can be utilized to implement the embodiments described above.

Example System

Figure 10:
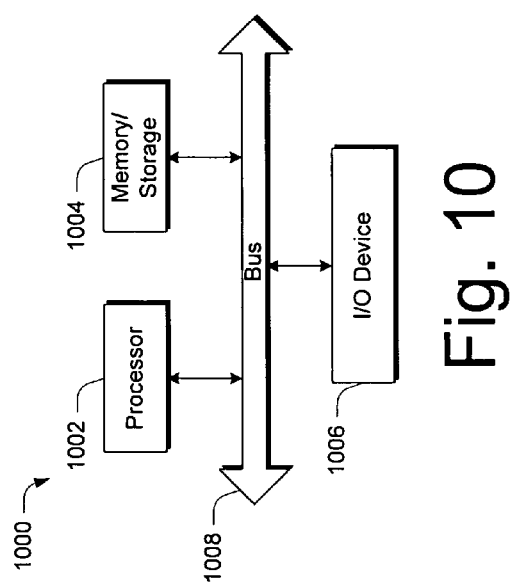
FIG. 10 is a block diagram of a system in accordance with one or more embodiments.

FIG. 10 illustrates an example computing device 1000 that can implement the various embodiments described above. Computing device 1000 can be, for example, computing device 102 of FIG. 1 or any other suitable computing device.

Computing device 1000 includes one or more processors or processing units 1002, one or more memory and/or storage components 1004, one or more input/output (I/O) devices 1006, and a bus 1008 that allows the various components and devices to communicate with one another. Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth).

One or more input/output devices 1006 allow a user to enter commands and information to computing device 1000, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

In the embodiments described above, a Web browser is configured to enable a user to open a new tab and, responsively, display one or more activities in a new tab page for the user. The user can then select, from the new tab page, one or more activities to be performed. In at least some embodiments, a user can select an object in a first tab page, open a new tab page, and select an activity on the new tab page that is to be performed relative to the selected object.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving a user's selection of an object;
placing a selected object on a clipboard;
receiving user input to open a new tab in a Web browser;
opening the new tab responsive to the user input;
ascertaining multiple activities that are relevant to the selected object and which are presentable in a new tab page; and
presenting the multiple activities in the new tab page, at least one activity being executable over the Internet, the new tab page comprising a first page that is presented to the user when the new tab is opened, said multiple activities being automatically presented to the user, and at least some of the multiple activities being invokable to use the selected object as a subject of the activity.

2. The method of claim 1 further comprising performing a user-selected activity using, as a subject of a performed activity, the selected object.

3. The method of claim 1, wherein said object comprises text.

4. The method of claim 1, wherein said object comprises a webpage.

5. The method of claim 1, wherein said object comprises an image.

6. The method of claim 1, wherein said object comprises an object other than text.

7. The method of claim 1, wherein said presenting comprises presenting one or more default activities.

8. The method of claim 1, wherein said presenting comprises presenting at least one activity from a category of activities available to the user.

9. The method of claim 1 further comprising presenting a feature in the new tab page that enables the user to collapse presented activities.

10. The method of claim 1 further comprising presenting a feature in the new tab page that enables the user to check data that appears on a clipboard.

11. The method of claim 1 further comprising presenting a feature in the new tab page that enables a user to manage activities from the new tab page.

12. A system comprising:
one or more computer readable storage media;
computer readable instructions embodied on the one or more computer readable storage media which, when executed, implement a Web browser configured perform operations comprising:
receiving a user's selection of an object;
placing a selected object on a clipboard;
receiving user input to open a new tab in a Web browser;
opening the new tab responsive to the user input;
ascertaining multiple activities that are relevant to the selected object and which are presentable in a new tab page; and
presenting the multiple activities in the new tab page, at least one activity being executable over the Internet, the new tab page comprising a first page that is presented to the user when the new tab is opened, said multiple activities being automatically presented to the user, and at least some of the multiple activities being invokable to use the selected object as a subject of the activity.

13. The system of claim 12, wherein the Web browser is configured to perform operations comprising performing a user-selected activity using, as a subject of a performed activity, the selected object.

14. The system of claim 12, wherein said object comprises text.

15. The system of claim 12, wherein said object comprises a webpage.

16. The system of claim 12, wherein said object comprises an image.

17. The system of claim 12, wherein said object comprises an object other than text.

18. A computing device comprising:
one or more processors;
one or more computer readable storage media;
computer readable instructions embodied on the one or more computer readable storage media which, when executed, implement a Web browser configured perform operations comprising:
receiving a user's selection of an object;
placing a selected object on a clipboard;
receiving user input to open a new tab in a Web browser;
opening the new tab responsive to the user input;
ascertaining multiple activities that are relevant to the selected object and which are presentable in a new tab page; and
presenting the multiple activities in the new tab page, at least one activity being executable over the Internet, the new tab page comprising a first page that is presented to the user when the new tab is opened, said multiple activities being automatically presented to the user, and at least some of the multiple activities being invokable to use the selected object as a subject of the activity.

19. The computing device of claim 18, wherein said object comprises at least one of: text, a webpage, an image.

20. The computing device of claim 18, wherein said object comprises an object other than text.

\* \* \* \* \*